United States Patent [19]

Pall et al.

[11] Patent Number: 4,726,901
[45] Date of Patent: Feb. 23, 1988

[54] CYLINDRICAL FIBROUS STRUCTURES WITH GRADED PORE SIZE

[75] Inventors: David B. Pall, Roslyn Estates; Colin F. Harwood, Glen Cove; Arthur Bradley, Floral Park; Timothy R. Brennan, Old Westbury, all of N.Y.

[73] Assignee: Pall Corporation, Glen Cove, N.Y.

[21] Appl. No.: 839,987

[22] Filed: Mar. 17, 1986

Related U.S. Application Data

[62] Division of Ser. No. 568,824, Jan. 6, 1984, Pat. No. 4,594,202.

[51] Int. Cl.⁴ .................. B01D 27/04; B01D 29/14
[52] U.S. Cl. .................. 210/496; 210/497.2; 210/505; 264/8; 55/487
[58] Field of Search .............. 210/483, 496, 497.01, 210/497.2, 503, 505, 510.1; 264/8, 12, 14; 209/363, 409; 55/486, 487, 500, 521, 527, 43, 45; 428/299, 300, 303, 364, 365, 394, 395

[56] References Cited

U.S. PATENT DOCUMENTS

| | | | |
|---|---|---|---|
| 2,411,660 | 11/1944 | Manning | 156/167 |
| 2,413,551 | 1/1945 | Englund | 51/400 |
| 2,539,768 | 1/1951 | Anderson | 210/496 |
| 2,826,265 | 3/1958 | De Woody | 55/279 |
| 2,980,204 | 7/1961 | Jordan | 55/487 |
| 3,073,735 | 1/1963 | Till et al. | 210/503 |
| 3,158,532 | 11/1964 | Pall et al. | 210/505 |
| 3,210,229 | 10/1965 | Feine | 156/213 |
| 3,248,465 | 12/1965 | Painter et al. | 521/55 |
| 3,251,475 | 2/1966 | Till et al. | 210/508 |
| 3,252,270 | 3/1966 | Pall et al. | 55/74 |
| 3,261,473 | 7/1966 | Riede | 210/282 |
| 3,268,084 | 8/1966 | Allman, Jr. et al. | 210/503 |
| 3,268,442 | 8/1966 | Pall et al. | 210/702 |
| 3,599,797 | 7/1969 | Mikulski | 210/496 |
| 3,690,852 | 6/1970 | Smith et al. | 427/201 |
| 3,801,400 | 4/1974 | Vogt et al. | 156/167 |
| 3,904,798 | 4/1975 | Vogt et al. | 428/36 |
| 3,933,557 | 1/1976 | Pall | 156/167 |
| 3,959,421 | 5/1976 | Weber et al. | 264/6 |
| 3,972,759 | 8/1976 | Buntin | 156/167 |
| 4,021,281 | 5/1977 | Pall | 156/167 |
| 4,044,404 | 8/1977 | Martin et al. | 19/286 |
| 4,112,159 | 9/1978 | Pall | 428/36 |
| 4,116,738 | 9/1978 | Pall | 156/167 |
| 4,211,736 | 7/1980 | Bradt | 264/8 |
| 4,594,202 | 6/1986 | Pall et al. | 264/8 |

FOREIGN PATENT DOCUMENTS

| | | |
|---|---|---|
| 2314264 | 3/1973 | Fed. Rep. of Germany . |
| 2314287 | 3/1973 | Fed. Rep. of Germany . |
| 4223998 | 2/1983 | Japan . |
| 4319099 | 4/1983 | Japan . |
| 4516854 | 9/1984 | Japan . |
| 141521 | 3/1980 | Norway . |

OTHER PUBLICATIONS

"Hytrex Cartridge Filters", Trade Literature No. 701-10/01/78.
"Superfine Thermoplastic Fibers", *Industrial and Engineering Chemistry*, Van A. Wente, vol. 48, No. 8, pp. 1342-1346 (1956).

*Primary Examiner*—Richard V. Fisher
*Assistant Examiner*—Wanda L. Millard
*Attorney, Agent, or Firm*—Leydig, Voit & Mayer

[57] ABSTRACT

Cylindrical fibrous structures comprising a fibrous mass of nonwoven, synthetic, polymeric microfibers wherein the microfibers are substantially free of fiber-to-fiber bonding and secured to each other by mechanical entanglement or intertwining, the fiber structure having a substantially constant voids volume over at least a substantial portion of the structure and, preferably, a graded fiber diameter structure, both as measured in the radial direction. The structures are particularly useful as depth filters.

35 Claims, 8 Drawing Figures

4,726,901

CYLINDRICAL FIBROUS STRUCTURES WITH GRADED PORE SIZE

This application is a division of application Ser. No. 568,824 filed Jan. 6, 1984, now U.S. Pat. No. 4,594,202.

Technical Field

This invention relates to cylindrical fibrous structures. More particularly, this invention is directed to cylindrical fibrous structures comprising nonwoven, synthetic, polymeric microfibers particularly useful as depth filters for a variety of fluid clarification applications.

BACKGROUND ART

Nonwoven structures formed from a variety of materials, including natural and synthetic fibers in both staple and continuous form, have long been known and used in depth filter operations. Such depth filters generally have a range of pore diameters. If the filter medium is thin, the larger particles in the fluid being filtered will pass through those areas having the larger pores. If the effluent passing through the filter medium is then passed through a second equal layer, some of the larger particles remaining in the fluid will be removed as they encounter more finely pored areas. Similarly, use of a third equal filter layer will remove additional large particles, further increasing the filtration efficiency. Use of a thick layer of filter medium will have the same effect as using multiple layers of equal total thickness. The increased efficiency so obtained is one of the motivations for using depth filtration.

To be useful for a given application, a depth filter must provide the requisite level of efficiency, that is, an acceptable level of removal of particles of a specified size present in a fluid being filtered. Another important measure of the performance of a filter is the time to clogging in a given type of service, that is, the time at which the pressure across the filter has either reached a level at which an undesirable or unacceptable power input is required to maintain adequate flow, or the potential for filter collapse with the accompanying loss of integrity and effluent contamination is too high.

To extend filter life, it has long been the practice to design depth filters such that their density is lower in the upstream portions, thus providing relatively larger pores upstream and smaller pores downstream. By virtue of the graded density, the contaminated fluid passes through progressively smaller pores, and particulate material being filtered from the incident fluid penetrates to varying depths according to its size, thereby allowing the filter element to accomodate more solids (a higher dirt capacity) without affecting flow and consequently providing a longer effective life for the depth filter. Stated otherwise, in theory, the larger upstream pores remove larger particles which would otherwise clog the downstream, finer pores and filter life is thereby extended.

The density of the filter medium is, however, in itself, an important determinant of the medium's behavior in service. The optimum density of a filter medium is determined by two factors:

(1) In order to have a high dirt capacity, the percent voids volume in the depth filter should be as high as possible. The reasons for this may be seen by comparing a gravel screen made using woven wire with a metal plate equal in size to the screen but containing a single hole. The metal plate will be clogged by a single oversized particle, while the screen, requiring a large number of particles to become clogged, will remain in service longer.

(2) In a fibrous depth filter, there is an upper limit beyond which further increasing the percent voids volume becomes undesirable. As the voids volume is increased, the fibrous depth filter is more readily compressed by the pressure drop generated by the fluid passing through it; this is particularly troublesome when the fluid is viscous where, if the percent voids volume is too high, the filter medium will collapse at a very low differential pressure. As it collapses, the pores become smaller and the differential pressure increases, causing still more compression. The resulting rapid increase in pressure drop then tends to reduce life rather than—as might otherwise be expected with a high voids volume filter—extending it. Use of a very low density (high voids volume) can also make the filter very soft and thereby easily damaged in normal handling.

Thus, there is a practical upper limit to voids volume, the value of which depends on the clean differential pressure at which the filter is to be used. For any given type of service there will be an optimum percent voids volume at which filter life will be at a maximum.

As noted above, attempts have previously been made to provide depth filters from fibrous materials and to extend their effective life by providing a graduated porosity, accomplished by a density profile with the density increasing in the direction of flow of the fluid being filtered. These attempts have met with some success but the filter structures have substantial limitations. These include relatively short life due to the limited range through which pore diameters can be changed, and reduction in pore diameters due to compression when used with viscous fluids or at very high liquid flow rates.

The subject invention, then, is directed to cylindrical fibrous structures, particularly useful as depth filters, and a method of manufacturing them which substantially overcomes the shortcomings of the cylindrical fibrous depth filters which have heretofore been used. As will become apparent from the following description of the invention, the cylindrical fibrous structures of this invention typically have, relative to fibrous cylindrical depth filters of the type previously available, extended filter life, i.e., higher dirt capacity at equal efficiency, or better efficiency at equal life, or both better efficiency and higher dirt capacity. They also have the ability to remove much finer particulate contaminants than have heretofore been capable of being removed by previously available commercial fibrous cylindrical depth filters.

DISCLOSURE OF INVENTION

In the method of this invention, synthetic polymeric material is fiberized by extrusion into a high velocity gas stream and collected as a mass of mechanically entangled or intertwined fibers in the form of a hollow or annular cylindrical structure, as will be described in more detail below. In the course of investigating this process, and the products thereof, several surprising observations were made:

(a) Increasing the percent voids volume (by decreasing the density) generally yielded only a small increase in filter life.

(b) When the project was initiated, it was assumed that if two filters differing in fiber diameter but otherwise equal were compared, the filter with the finer fiber would be more compressible. Contrary to this assumption, it was found that the filter with finer fibers had a resistance to compression that was substantially equal to that with coarser fibers, providing that the densities of the two filters, i.e., the percent voids volume, were the same. As a consequence of this discovery, cylindrical filter structures using fibers as fine as about 1.5 micrometers were prepared and found to have satisfactory resistance to compression. Cylindrical filter structures, or cylindrical filter elements as they are sometimes referred to herein, made with fibers in the range of from about 1.5 to about 2.5 micrometers and with annular thicknesses of the fibrous mass of about 0.6 inch (1.5 cm), had extraordinarily high efficiencies, for example, in excess of 99.9999 percent for removal of bacteria organisms as small as 0.3 micrometer in diameter.

(c) Because of the desirable characteristics obtainable with depth filters prepared from these very fine fibers, cylindrical filter structures with fine fibers in their downstream portions and coarser fibers upstream but with a constant voids volume throughout were prepared. These filter elements combined extraordinary efficiencies, e.g., 99.999 percent, removal for bacteria organisms as small as 0.3 micrometer in diameter with relatively high dirt capacities comparable to dirt capacities of much coarser conventional cylindrical depth filter elements.

The cylindrical fibrous structures of this invention comprise a fibrous mass of nonwoven, synthetic, polymeric microfibers, the fibrous mass having a substantially constant voids volume over at least a substantial portion of the fibrous mass, preferably at least the major portion, as measured in the radial direction. The microfibers are substantially free of fiber-to-fiber bonding and are secured to each other by mechanical entanglement or intertwining. Filter structures of the subject invention are preferably supported by the incorporation of a hollow, open, relatively rigid, central support member or core, with the fibrous mass of microfibers on the exterior of the support member. Also, for most applications, it is preferred that the fibrous mass have a substantially constant voids volume and a graded fiber diameter structure over at least a portion thereof as measured in the radial direction, obtained by progressively varying the fiber diameter as the cylindrical fibrous structure is built up while simultaneously holding the voids volume constant.

The method of manufacturing the cylindrical fibrous structures of the subject invention comprises the steps of:

(a) extruding synthetic, polymeric material from a fiberizing die and attenuating the extruded polymeric material to form synthetic, polymeric microfibers by the application of one or more gas streams directed toward a rotating mandrel and a forming roll in operative relationship with the mandrel;

(b) cooling the synthetic, polymeric microfibers prior to their collection on the mandrel to a temperature below that at which they bond or fuse to each other to substantially eliminate fiber-to-fiber bonding; and (c) collecting the cooled microfibers on the mandrel as a nonwoven, fibrous mass while applying a force on the exterior surface of the collected microfibers on the mandrel by the forming roll to form the cylindrical structure, wherein the process variables are controlled to provide the collected fibrous mass with a substantially constant voids volume over a substantial part thereof, preferably at least the major portion, as measured in the radial direction.

It is preferred, especially for coarser fibers, that cooling of the microfibers be enhanced by the injection of a cooling fluid into the stream of the microfibers prior to their impingement on the mandrel or the forming roll to assist in eliminating fiber-to-fiber bonding.

Additionally, it is preferred that the attenuated microfibers impinge on the forming roll which is held at a temperature substantially below the melting or softening point of the fibers to further enhance cooling prior to the microfibers being transferred to and collected on the rotating mandrel, thereby providing additional cooling and further reducing the likelihood of undesirable fiber-to-fiber bonding. Preferably, the stream of microfibers is directed toward the forming roll and mandrel in such a manner that at least the major portion contact the forming roll first (where they are cooled further) and from where they are then transferred to the rotating mandrel. Also, if the forming roll is wet, particularly when microfiber collection on the mandrel is initiated, more consistent start-ups are obtained due to better (more uniform) transfer of the microfibers to the mandrel, i.e., the potential for undesirable layer-to-layer bonding is reduced and a smoother wrapping with minimized clumping and a more regular or uniform laydown of fibers is obtained.

In addition, the apparatus is preferably designed so as to allow free access of secondary air in order to assist in the rapid cooling of the hot, freshly formed fibers.

BEST MODE FOR CARRYING OUT THE INVENTION

Figure 1:
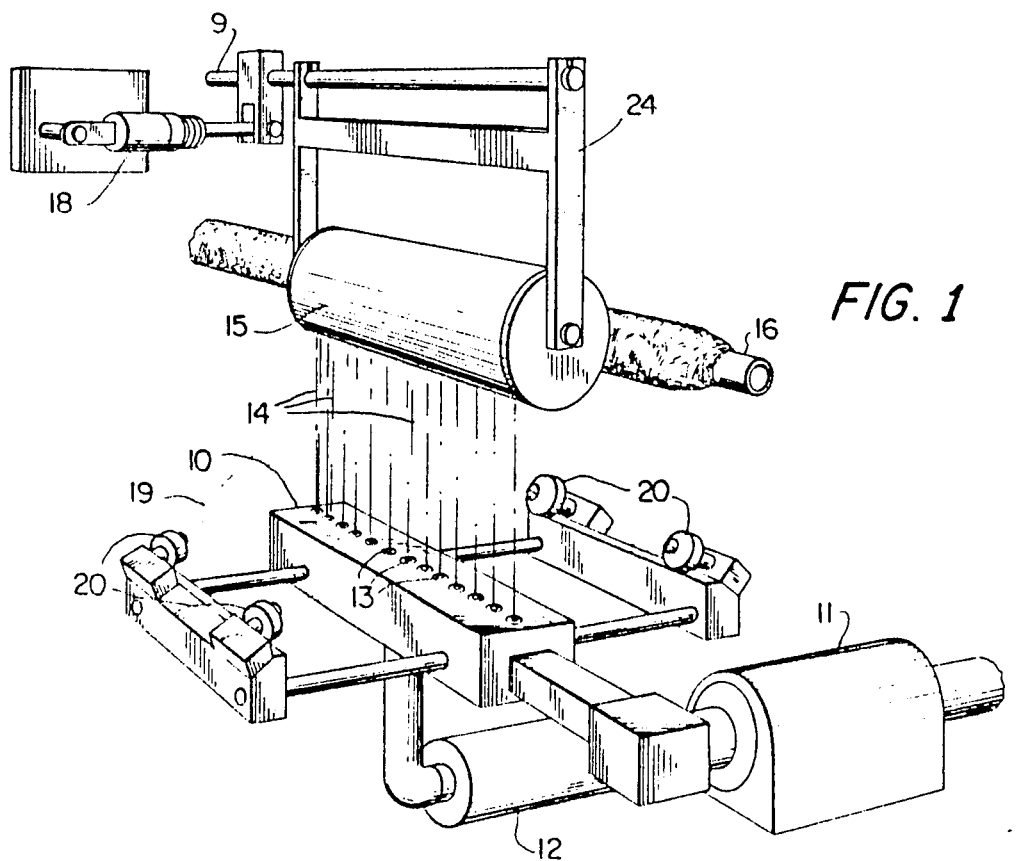
FIG. 1 is a perspective view of an apparatus which can be used to form the cylindrical filter structures of this invention.

The subject invention will be better understood by reference to the drawings. Turning first to FIG. 1, there is shown an apparatus useful for forming the cylindrical filter structures of the subject invention comprising a fiberizer or fiberizing die 10 to which molten resin is delivered by a motor-driven extruder 11 and to which hot compressed gas, preferably air, is delivered from a heater 12. The fiberizer 10 contains a multiplicity of individual extrusion nozzles 13 by which the molten resin is converted to fibers. In the preferred mode illustrated in FIG. 1, the hot resin (or polymeric material) stream delivered from the extruder 11 to the fiberizer 10 issues from each nozzle under pressure (fiberizing air pressure). The molten, thermoplastic polymeric microfibers generally designated 14 are formed as the resin is extruded from the nozzles 13 and attenuated by the jets of hot gas referred to above which carry the microfibers upward in the direction of a cylindrical forming roll 15 which is in operative, rotating relationship with the power driven rotating, and preferably also reciprocating, mandrel 16. The forming roll 15 may be cooled, e.g., by passing unheated ambient air through its internal portions. When a supported filter structure is being formed, prior to initiation of collection of the microfibers on the mandrel, one or more open, relatively rigid central support members or filter cores 17 (such as that shown in detail in FIG. 3) are placed on the mandrel. Alternatively, as discussed below, for some low pressure applications a central support member or core may not be required, in which event the cylindrical filter structure can be formed directly on a solid mandrel. The mandrel 16 and the filter cores 17 are designed such that the cores rotate with the mandrel, either by means of friction between the filter cores and the mandrel or by use of springs or other arrangement.

Figure 3:
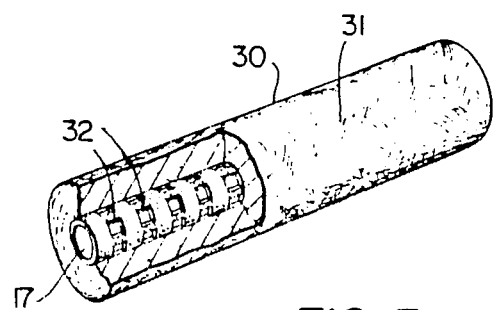
FIG. 3 is a partially cut away perspective view of a cylindrical filter structure of this invention.

The forming roll 15 is preferably mounted on bearings so that it is freely rotatable, i.e., it rotates freely when in contact with the mandrel 16 or with fibrous material collected on the mandrel 16 or with filter support cores 17 (as illustrated in FIG. 3) which may be placed on the mandrel 16. Additionally, the forming roll 15 is preferably biased, for example, by an air cylinder 18, operating on the shaft 9 which is rotatably mounted on bearings. The air cylinder 18 through the shaft 9 applies bias to the forming roll 15 in a controlled manner towards or away from the mandrel 16. Depending on the frictional characteristics of the air cylinder and the character of the fibers being collected, damping of the shaft 9 may be desirable to prevent vibration of the forming roll 15.

The mandrel 16 is rotated by a motor (not shown), generally at a rate of from about 50 to about 500 rpm, and, in the preferred embodiment shown in FIG. 1, is reciprocated axially at a rate generally between about 10 (3.0 meters) and about 300 feet (91.4 meters) per minute. The length of stroke of the reciprocating mandrel will depend on the desired length of the cylindrical filter structure or structures being formed.

Especially when making relatively coarse fibers, a suspension of finely divided water droplets 19, or other cooling fluid, is preferably injected into the stream of fibers 14 from one or both sides by the nozzles 20, impinging on the stream of fibers a short distance above the extrusion nozzles 13, e.g., 1 to 5 inches (2.5 to 12.7 cm) to cool the microfibers and help prevent fiber-to-fiber bonding.

In operation, the microfibers are projected upward in the direction of the forming roll 15 and the mandrel 16, generally at least in part impinging on the forming roll 15, from where they are continuously transferred to the filter cores 17 mounted on the rotating, reciprocating mandrel 16. As the mandrel 16 rotates and reciprocates, the diameter of the cylindrical mass of fibers collected on the filter cores 17 increases.

It is generally preferred that at least the major portion of the fibrous stream 14 impinge on the forming roll 15 rather than on the mandrel 16 as this results in a more uniform and more reproducible product in which the fibers exhibit little or no undesirable interfiber bonding, i.e., they are substantially free of fiber-to-fiber bonding.

Figure 2:
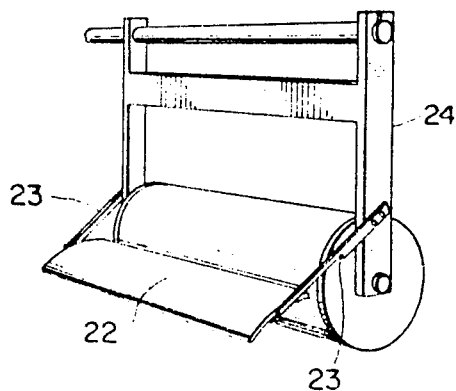
FIG. 2 is a perspective view showing an ancillary collection means which can be used with the apparatus of FIG. 1.

Under some conditions, particularly when collecting fibers less than about 1.8 to 2 micrometers in diameter, an auxiliary collection member 22, as is shown in FIG. 2, may be used to advantage. This member can be a flat, stationary—relative to the forming roll—sheet or plate. Alternatively, it may have a moderate radius with the concave side facing downwards toward the fibrous stream 14. It is preferably mounted such that one edge is about 0.1 inch (0.25 cm) or less from the forming roll surface. The collection member 22 is secured by brackets 23 to the frame 24 supporting the forming roll 15. The function of member 22 is to collect fine fibers which would otherwise bypass the forming roll. As rapidly as these fibers collect on member 22, they are transferred to the forming roll 15 and thence to the rotating reciprocating mandrel 16.

The system used for fiberizing the resin or polymeric material can take a variety of forms, many of which have been set forth in the patent and journal literature. See, for example, the paper titled "Superfine Thermoplastic Fibers" in the August 1956, Volume 48, Number 8, edition of *Industrial and Engineering Chemistry*. The resin stream or streams can be discontinuous (i.e., delivered by individual nozzles) or continuous (i.e., delivered through a slot), and the air stream or streams can be similarly continuous or discontinuous. Additionally, combination of these design configurations can be used, e.g., when preparing a filter element from two or more different polymeric materials.

Also, a number of process variables can be controlled to provide any desired combination of fiber diameter and voids volumes within the limits of the apparatus. As will be evident from consideration of the Examples below, it is preferred that four variables be used in operating the apparatus of FIG. 1. These are:

(1) The Rate Of Delivery Of Resin (Or Polymeric Material) To The Fiberizing Die:
   This rate is adjusted by increasing or decreasing the pressure developed by the extruder, which in turn is accomplished by changing its speed. As the rate is increased, coarser fiber is generated and voids volume of the collected fiber cylinder tends to decrease.

(2) The Fiberizing Gas Flow Rate:
   This rate is adjusted by altering the pressure at which the gas, typically air, is delivered to the fiberizing die. As the flow rate of the gas stream (or streams) is increased, the fiber diameter becomes smaller and the voids volume tends to increase.

(3) The Forming Roll Pressure:
   The forming roll pressure is varied as required to maintain the voids volume constant. For example, if the fiberizing gas rate is decreased to increase the diameter of the microfibers, the forming roll pressure must be decreased to maintain a constant voids volume.

(4) The Quantity And Type Of Fiber Cooling:
   These include the quantity of secondary air, die to collector distance (see below), the temperature of the forming roll on which it is preferred that the fibers impinge, the quantity and mode of delivery of liquid coolant, and the rate of rotation and reciprocation of the mandrel. When fiber diameter is smaller than about 3 to 6 micrometers, water cooling is not required, although it can be used. The effect of these various cooling means on the density of the collected fiber varies and must be determined empirically.

Other process variables which influence the character of the formed filter cylinder but which once set—in the preferred mode of operation—no longer need be altered include:

(1) The fiberizing die to collector distance (DCD), if too large, permits the fiber to form bundles prior to deposition on the forming roll (a phenomenon known as "roping"), causing the formation of a non-uniform product. If DCD is too small, the fibers may be insufficiently cooled when collected and this may result in melting or softening, which tends to close off pores and obstruct free flow of fluids through the fibrous mass when used as a filtering device.

The optimum DCD depends upon the diameter and velocity of the fibers and upon the rapidity with which they are cooled and is best determined by trial and error.

DCD can be used as a controlling variable and, indeed, was so used during the early phases of the development of this invention but was discontinued because it proved easier and adequate to vary the four variables listed above.

(2) The temperature of the resin or polymeric material supplied to the fiberizing die has a strong effect on product characteristics. As this temperature is increased, fiber diameter decreases, but excessive temperatures cause the production of very short fibers and shot, as well as significant reduction in resin molecular weight due to depolymerization. The optimum temperature is best determined by trial and error since it depends on a number of factors, including the particular polymeric material, the nature of the structure desired and the particulars of a given apparatus, for example, the extruder size as related to the resin flow rate.

(3) The temperature of the fiberizing air has a relatively minor effect, provided that it is held within about 50 degrees F. (28 degrees C.) of the resin temperature.

(4) The temperature of the forming roll is preferably low, for example, near ambient, to help prevent interfiber fusing of the fibers collected on it prior to transfer to the rotating reciprocating mandrel.

(5) The rate of rotation of the mandrel; higher rotation rates help to prevent interfiber bonding.

(6) The rate of reciprocation of the mandrel; higher reciprocation (or axial translation) rates help to prevent interfiber bonding.

By the method of this invention, the fiber diameter of the cylindrical fibrous structures can be varied in a continuous or step-wise manner from one part of the cylindrical structure of the fibrous mass to another—as measured in the radial direction—by varying the resin and fiberizing air flow rates while the voids volume is maintained substantially constant by varying the forming roll bias force on the cylindrical mass of fibers as the structure is formed on the rotating mandrel. As may be seen in FIG. 8, if the voids volume is constant, the pore size varies with the fiber diameter. By the process of this invention, the pore diameter can be varied continuously or stepwise from one part of the fiber to another in any desired manner.

When the desired outside diameter of the cylindrical fibrous structure has been reached, the operation is terminated by discontinuing the flow of resin and air onto the forming roll 15, discontinuing or reversing the bias of the forming roll 15 and stopping the mandrel 16, following which the formed cylindrical fiber structure together with the core or cores is removed from the mandrel 16. The ends of the resulting cylindrical structure are then cut to length and if more than one core 17 has been used, additional cuts are made to separate each section, thereby forming individual cylindrical filter structures, sometimes referred to herein as filter cylinders, filter elements or simply as elements. A cylindrical filter structure of this invention is illustrated in FIG. 3. The cylindrical filter structure generally designated 30 is comprised of the hollow support core 17 and a fibrous mass of nonwoven, synthetic, polymeric microfibers 31.

As noted above, for some applications it may be desirable to form the cylindrical fibrous structures of this invention directly on the mandrel without the use of an internal support or core. For most purposes, however, it is desired that the structure, when used as a filter, be able to withstand, without collapse or loss of integrity, differential pressures of 40 psi (2.81 kg/cm$^2$) or higher. The voids volumes of the unbonded fibrous mass of the filter structures of this invention which yield desirable combinations of high efficiency and long life in service are, in general, too high to withstand pressures of this magnitude and would collapse if an internal support member were not provided. Accordingly, for most applications, it is desirable to form the filter on a hollow foraminous, or open, relatively rigid central support member or core designed in such a way as to provide support for the collected fiber or fibrous mass. The central support member or core 17 must be open or foraminous in nature, as illustrated in the perspective view of a typical supported cylindrical filter structure in FIG. 3, since it must provide adequate passages for flow of filtered fluid into the central portion of the core (outside/in filter configuration) or, conversely, passage of fluid to be filtered from the hollow center of the filter structure into the fibrous mass (inside/out configuration). Typically, the core, which is relatively rigid vis-a-vis the mass of collected fibers on the exterior thereof in order to provide the requisite support, will have openings 32 with spans preferably on the order of one-quarter inch (0.6 cm) or less and, generally, not more than one-half inch (1.3 cm).

The central support member or core can be made by a variety of processes and from a variety of materials, for example, from synthetic resin by injection molding or extrusion, or from metal by conventional processes. While not required, the core may have a multiplicity of small protuberances on its exterior to assist in securing the microfibers to the exterior of the core.

Another alternative is to build up a support core of self-bonded fibers on the mandrel by operating under conditions such that fiber-to-fiber bonding occurs during the first part of the formation of the fibrous structure, e.g., by minimizing the type and quantity of fiber cooling, following which the method of this invention is carried out under conditions such that fiber-to-fiber bonding is substantially eliminated. The resulting structure has the internal support necessary to prevent collapse of the element under conventional operating pressures and has the added benefit that the portion of the structure which is self-bonded (the central support member) has some filtering capability.

For very low pressure service, for example, in the range of about 5 to about 25 psi (0.35 to 1.76 kg/cm$^2$), the cylindrical depth filters of this invention can be made directly on a smooth mandrel and used without a core. It is, of course, also possible to make a coreless cylindrical filter structure and subsequently incorporate a core or central support member therein.

The preferred fibrous structures prepared by the method of the subject invention are comprised of a fibrous mass of nonwoven, synthetic, polymeric microfibers which are substantially free of fiber-to-fiber bonding, secured to each other by mechanical entanglement or intertwining, and wherein the fibrous mass has a substantially constant voids volume, typically in the range of from about 60 to about 95 percent, more preferably from about 64 to about 93 percent and even more preferably from about 75 to about 85 percent. When polypropylene is used as the resin, the most preferred voids volume is about 82 percent. Typically, the annular thickness of the cylindrical fibrous structures of this invention, particularly when used as depth filters, is in the range of from 0.4 to 1 inches (1.0 to 2.5 cm), preferably in the range of 0.5 to 0.8 inches (1.3 to 2.0 cm), and more preferably in the range of 0.6 to 0.7 inches (1.5 to 1.8 cm). As will become more evident from the following Examples, the combination of these characteristics in the cylindrical filter structures of this invention result in high filter efficiency and enhanced dirt capacity or life.

Polymeric materials particularly well suited for use in this invention are thermoplastics such as the polyolefins, particularly polypropylene and polymethylpentene, polyamides, particularly nylon 6, nylon 610, nylon 10, nylon 11, nylon 12, and polyesters, particularly polybutylene terephthalate and polyethylene terephthalate. Other suitable, but less preferred, polymers are addition polymers such as polyvinyl fluoride, polyvinylidene fluoride and their copolymers, and polycarbonates.

The process of the invention can also be applied to solutions of resin in appropriate solvents, in which case temperatures can vary down to ambient or lower. In this mode the solvent must be at least largely evaporated before the fibers are collected to avoid fiber-to-fiber bonding.

Thermoset resins in partially polymerized form can be fiberized but are not a preferred starting material as operation with them is more complex.

The fiber diameters can be varied from about 1.5 micrometers or less up to about 20 micrometers or more. However, when the product is made in the preferred voids volume range of 75 to 85 percent, fiber diameters above about 20 micrometers make elements so coarse as to have little use for filtration applications.

Fiber aspect ratios are large, e.g., 1,000 or higher. Indeed, it is very difficult even by microscopic examination, to determine length to diameter ratios as fiber ends are difficult to find.

Various additives, such as activated carbon, ion exchange resins, and the like, can be incorporated into the cylindrical fibrous structures of this invention by, for example, feeding them into the stream of fibers prior to laydown. Also, the cylindrical fibrous structures of this invention can be formed in any desired length. The cylindrical fibrous structures can be further processed by, for example, the application of an external support and the incorporation of end caps shaped so as to fit within the particular filter assembly in which the resulting filter element is to be used.

The term "substantially free of fiber-to-fiber bonding", as used herein, refers to the characteristics of the microfibers making up the fibrous mass portion of the cylindrical fibrous structures of this invention. The microfibers are mechanically entangled or intertwined. It is this mechanical entanglement which provides the structural integrity of the fibrous mass portion of the structure. When examined under a microscope at 10× to 100× the fibrous portion of the filter structure may display random fiber-to-fiber bonding but such bonding is in an amount that would not be significantly detrimental to filter function nor contribute in any material way to the structural integrity of the filter. Additionally, it is possible, by the use of tweezers, to separate out fibers which have clean, smooth profiles, free of protuberances and of unseparable clumps of fibers of the type which typically appear on fibers in structures containing substantial fiber-to-fiber bonding.

The term "substantially constant voids volume", as used herein, means the average voids volume of the fibrous mass portion of the cylindrical filter structure varies by no more than about 1 to 2 percent. Voids volume determinations or, alternatively, densities, were carried out by use of a series of 5 U-shaped gauges. Diameters of the gauges were selected such that the difference between each successive gauge represented one-fifth of the total volume of the collected fiber on the cylindrical filter structure as it was being formed. With the polymeric material or resin delivered at a constant rate, the time required to reach the diameter of each gauge was recorded. This procedure was repeated as ten successive filter cylinders were prepared under the same conditions and the times averaged. The percent voids volume determined by this procedure was found accurate to within about 2 percent, and in the case of finer fibers, to within about 1 percent.

Figure 8:
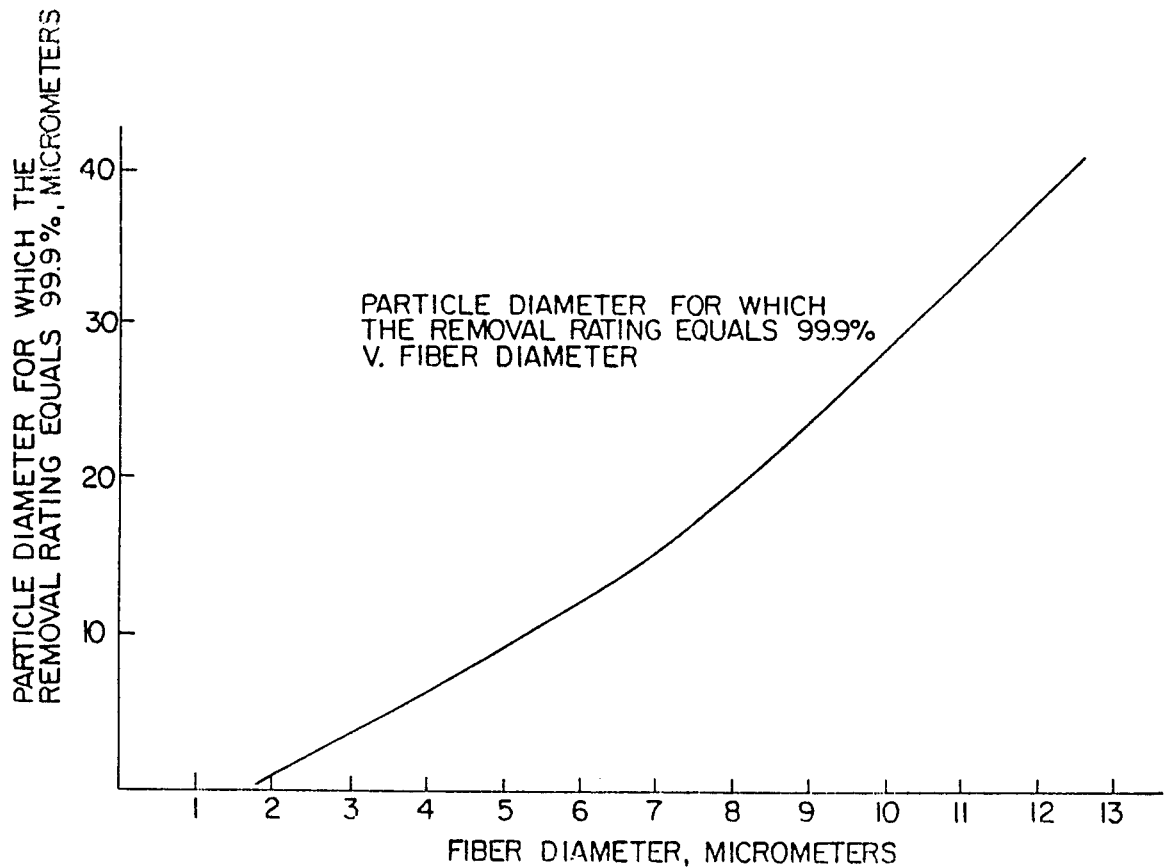
FIG. 8 is a graph of particle diameter for which the removal rating equals 99.9 percent versus fiber diameter.

As may be seen in FIG. 8 and in Table II below, filter elements each having a constant voids volume of 82 percent and a constant fiber diameter throughout (but varying from element to element from 1.9 up to 12.6 micrometers) provided removal ratings varying from less than 1 micrometer, e.g., 0.5 micrometers or even less, up to over 40 micrometers.

One configuration which is useful because it provides prefiltration for a very wide range of final filters is made using a program for forming roll pressure, resin rate, fiberizing air rate, and cooling water flow, which produces a constant density element with fibers varying in diameter from about 1.9 micrometer at the id (downstream) to about 12.6 micrometers at the od (upstream). The manner in which the fiber diameters are profiled can be varied widely, for example, for some applications a higher proportion of fine fibers could be used while for others more coarse fibers might be preferred. For general prefilter service, filter elements have been made in which the diameters of the fibers form a geometric progression. In such a construction, if the element is divided into N cylindrical portions, each containing the same weight (and volume) of fibers, then the fiber diameter of each portion is larger than that of the adajcent downstream portion by the factor F, where $$F = \left(\frac{12.5}{1.9}\right)^{\frac{1}{N-1}}$$

For example, if the number of sections were 20 (N=20), F would be 1.1042.

Another configuration, which is desirable because it combines absolute filtration with prefiltration, is one in which the downstream portion of the filter is made using constant fiber diameter, while the upstream portion is profiled from the fiber diameter of the downstream portion up to a larger diameter. The constant fiber diameter downstream portion of the filter element may comprise from about 20 to about 80 percent of the total volume of the fibrous filter mass and, correspondingly, the upstream profiled portion of the filter element may constitute from about 80 to about 20 volume percent. One preferred configuration is a filter element in which about the first 50 percent by volume of the element has a constant fiber diameter of 1.9 micrometers (down-stream portion) and the upstream portion has a graded fiber diameter structure, i.e., it is profiled, with the fiber diameter ranging from 1.9 micrometers up to 8 to 12 micrometers. Another configuration is as that immediately above but the constant fiber diameter portion has fibers with diameters of 8 micrometers and in the graded fiber diameter portion they range from 8 up to 12 to 16 micrometers.

Still another desirable configuration is one in which the downstream portion of the filter is made using a constant voids volume, with a constant fiber diameter, and the upstream portion has both a profiled fiber diameter and a profiled voids volume.

Filter elements have been made using fibers as small as 1.6 micrometers in diameter. Still finer fibers could be used but are not preferred because production rates become progressively lower and collection of the fibers becomes more difficult, with a larger proportion not collected on any of the working parts of the apparatus. Other elements have been made with fibers as coarse as 16 micrometers but such elements have removal ratings so large as to have limited practical application or, if made quite dense, relatively low dirt capacity. Filter elements made with their downstream portions composed of fibers of 13 micrometers or smaller can, however, for some applications, benefit from upstream layers profiled up to 16 micrometers or even higher.

Filter elements of this invention have been made using polypropylene resin with voids volumes varying from 64 to 93 percent. Voids volumes above about 85 to 88 percent are not preferred because they are deformed by relatively low differential pressure, for example, as low as 5 to 10 psi (0.35 to 0.7 kg/cm$^2$), with consequent change of pore diameter. Voids volumes below about 75 percent are not generally preferred for use in the operating range of most filters, which is up to about 40 to 60 psi (2.81 to 4.22 kg/cm$^2$) differential pressure, because filter life decreases as the voids volume is decreased. One exception is the use of lower voids volumes when making filters with fiber diameters at the low end of the practical fiber diameter range, for example, 1.6 to 2.0 micrometers. Such filters remove finer particles than would be obtained using higher voids volume and are useful for that reason. For filter operations with filter elements made from fibers having diameters from above about 1.6 to 2.0 micrometers and operating at differential pressures of up to about 40 to 60 psi (2.81 to 4.22 kg/cm$^2$), the preferred voids volume range is 78 to 85 percent. For applications in which differential pressures exceed 60 psi (4.22 kg/cm$^2$), and up to several hundred psi (14 kg/cm$^2$ or higher), lower voids volumes down to 60 percent or even less may be needed to prevent collapse under pressure. Somewhat higher voids volumes can be used with filter elements prepared from resin materials of relatively higher modulus, such as nylon 6, which have better resistance to deformation compared with polypropylene.

Efficiency, Removal Rating And Dirt Capacity (Life)

These characteristics were determined for 2.5 od×1.1 id×10 inch (6.35×2.8×25.4 cm) long elements using a modified version of the F2 test developed in the 1970s at Oklahoma State University. In this test a suspension of an artificial contaminant in an appropriate test fluid is passed through the test filter while continuously sampling the fluid upstream and downstream of the filter under test. The samples are analyzed by automatic particle counters for their contents of five or more different preselected particle diameters and the ratio of the upstream count to downstream count is automatically recorded. This ratio, known in the industry as the beta ($\beta$) ratio, provides the removal efficiency at each of the preselected particle diameters.

The beta ratio for each of the five or more diameters tested is plotted as the ordinate against particle diameter as the abscissa, usually on a graph in which the ordinate is a logarithmic scale and the abscissa is a log$^2$ scale. A smooth curve is then drawn between the points. The beta ratio for any diameter within the range tested can then be read from this curve. Efficiency at a particular particle diameter is calculated from the beta ratio by the formula:

Efficiency, percent = 100(1 − 1/beta).

As an example, if beta=1000, efficiency=99.9 percent.

Unless otherwise stated, the removal ratings cited in the examples presented below are the particle diameters at which beta equals 1,000 and the efficiency is 99.9 percent.

Efficiencies in the range of from 1 to about 20 to 25 micrometers were determined using as the test contaminant a suspension of AC fine test dust, a natural silicious dust supplied by the AC Spark Plug Company. Prior to use, a suspension of the dust in water was mixed until the dispersion was stable. Test flow rate was 10 liters/minute of the aqueous suspension. This same procedure was applied to filters having efficiencies of less than 1 micrometer by determining efficiencies at usually 1, 1.2, 1.5, 2, 2.5 and 3 micrometers and extrapolating the data to under 1 micrometer.

Efficiencies above about 20 micrometers were determined using Potter's Industries Incorporated #3000 spherical glass beads suspended in MIL-H-5606 hydraulic fluid. These glass beads have a distribution of sizes ranging from less than 15 micrometers up to 50 to 55 micrometers and higher. The viscosity of this fluid is approxmately 12 centipoise at the test temperature of 100 degrees F. (37.8 degrees C.). Test flow rate was 20 liters per minute. The higher viscosity and flow rate serve to keep beads up to about 100 micrometers in diameter in suspension.

Filters in the 20 to 25 micrometer range were often tested by both methods. The resulting efficiency and dirt capacity data were usually comparable.

In both the aqueous and oil based tests, pressure drop across the test filters was measured as the test suspension flowed through the filter and was recorded as a function of time. The quantity of contaminant incident on the filter required to develop a differential pressure of 60 psi (4.2 kg/cm$^2$) is recorded as the dirt capacity or "life" of the test element.

It is characteristic of depth filters, particularly in the coarser grades, that efficiency tends to be reduced at large differential pressure. Since filters are rarely exposed to differential pressures as high as 60 psi (4.2 kg/cm$^2$), efficiency data are reported as an average of about the initial two-thirds of the total life of the filter.

As noted above, data reported as less than 1 micrometer are obtained by extrapolation. In order to provide assurance that the extrapolated data were reasonably near to correct, or at least conservative, a number of the filter elements with high efficiencies at under 1 micrometer were further tested by passing suspensions of bacteria of known dimensions through them. The upstream and downstream bacteria concentrations were used to calculate efficiency. In all cases the efficiencies so determined either confirmed the extrapolated F2 test data or indicated a still higher efficiency.

The test in the finer ranges using the AC dust described above showed significant and reproducible beta ratios as high as 100,000 to 1,000,000 and therefore permitted measurement of efficiencies of up to and over 99.999 percent while the smaller number of glass beads permitted computation of efficiencies up to about 99.99 percent at up to about 40 micrometers and to successively lower efficiencies at larger diameters.

Filtration Testing Using Bacteria

Filtration of suspensions of bacteria of known size is a very useful high sensitivity method for determining filter efficiency. This test method is particularly appropriate for application to filters made using finer fibers and moderate to high density because bacteria removal is one of the important prospective applications for the finer grades of filters of this invention.

Bacteria removal tests were run in the following manner:

(a) A suspension in water of a pure strain of a bacterium of known dimensions was prepared at a concentration of about $10^{10}$ to $5 \times 10^{12}$ organisms per liter.

(b) The filter element was placed in an appropriate housing and 1 liter of the bacteria suspension passed through the element at a rate of 0.5 to 1 liter per minute.

(c) Aliquots of the effluent from the filter were collected and diluted with sterile water to 10, 100, 1,000, etcetera, fold. Each such diluted aliquot was then cultured in a Petri dish in an appropriate growth medium. Each bacterium present developed, within 24 to 48 hours, into a colony of bacteria large enough to be seen at low magnification using a microscope. The number of colonies in some dilutions was so great that the colonies could not be counted, while in others there were too few to be statistically significant. However, there was always at least one dilution providing a useful count, from which the total number of bacteria in the effluent could be calculated. Knowing the influent count and the effluent count, efficiency can be calculated.

The bacteria used in developing this invention included *Pseudomonas diminuta* (Ps.d) and *Serratia marcescens* (Serr. m.), the dimensions of which are respectively 0.3 micrometer diameter×0.6–0.8 micrometer long and 0.5 micrometer diameter×0.8 micrometer long.

The invention will be better understood by reference to the following Examples, which are offered by way of illustration.

EXAMPLE 1

Preparation of a Cylindrical Filter Structure of Uniform Fiber Size and Uniform Voids Volume (Ungraded)

The apparatus described above was used to prepare a supported cylindrical filter structure with a usable central section 36 inches long (91.4 cm long). The fiberizing die length was 6¼ inches (15.9 cm), the stroke of the reciprocating mandrel was 43¾ inches (111.1 cm), the mandrel rotation rate was 150 rpm, the axial translation rate was 500 inches (1270 cm) per minute, and the die to collector distance (DCD) was 12¼ inches (31.1 cm). The mandrel was fitted with three hollow foraminous (latticed) filter cores, each 1.1 inches (2.8 cm) inside diameter (id), 1.3 inches (3.3 cm) outside diameter (OD) by 9.8 inches (24.9 cm) long, of the type illustrated in FIG. 3. Polypropylene resin having a melt flow index of 30 to 35, was heated to 720 degrees F. (382 degrees C.) and the extruder rpm adjusted so as to give a total resin flow rate of 1.83 grams per second through the spaced nozzles, each having a gas stream surrounding the resin extrusion capillary, at a resin pressure of 625 psi (43.9 kilograms per cm$^2$). (Polypropylene resin having a melt flow index of 30 to 35 was the resin used in all the Examples herein unless otherwise noted.) A fiberizing air pressure of 4 psi (0.28 kilograms per cm$^2$) was used. The average fiber diameter produced under these conditions had previously been determined to be 12.5 micrometers. The microfibers having 12.5 micrometer diameters so produced were directed onto the air cooled forming roll which was biased towards the mandrel by an air cylinder pressurized to 8 psi (0.56 kg/cm$^2$) and were thence transferred to the filter cores on the rotating/reciprocating mandrel. Fiberizing and collection were continued until the od of the fibrous cylindrical filter structure (sometimes referred to herein as a "filter cylinder", a "filter element" or simply as an "element") reached 2.5 inches (6.35 cm).

The average density of the fibrous portion of the cylindrical filter structure of this Example was such as to yield a voids volume of about 81 percent (voids volume, in percent, equals 100(1-D/d), where D equals the apparent density and d equals the density of the resin, which is 0.9 grams per cubic centimeter for the polypropylene used).

The central section of the cylindrical filter structure was cut into three sections to make three filter cylinders, each 9.8 inches (24.9 cm) long and each having a corresponding 9.8 inches (24.9 cm) long filter core on the interior thereof. The respective voids volumes of the three filter cylinders were equal within the measurement error; each had a voids volume of 81.2 percent.

The three filter cylinders denoted A through C below were assembled into housings which provided appropriate end sealing means and were tested using the F2 test method described above, yielding the results listed below:

| Filter | Life or Dirt Capacity (grams) | Removal Rating, (micrometers) |
|---|---|---|
| A | 82 | 40 |
| B | 81 | 41 |
| C | 82 | 39 |

Microscopic examination of the elements was performed. With the exception of a limited number of small localized areas in which some undesirable fiber softening had occurred, the individual fibers could be pulled out of the mass using tweezers with no evidence of adhesion to neighboring fibers, i.e., the profiles of the fibers were smooth with no protuberances indicating fiber-to-fiber bonding.

It should be noted that in this Example, as in the following Examples where fibers of 2.5 micrometers or larger were formed, water spray was used to provide enhanced cooling of the fibers, thereby assisting in minimizing undesirable fiber-to-fiber bonding. The water spray was applied in the general manner illustrated in FIG. 1 at application rates sufficiently high, in connection with other cooling techniques as described, to provide structures substantially free of fiber-to-fiber bonding, e.g., in the range of about 80 to 40 cubic centimeters per minute.

EXAMPLE 2

Distribution Of Voids Volume Within Cylindrical Filter Structures Made Using Constant Forming Roll Pressure Using the apparatus described above and the general procedure described in Example 1, a series of elements, each having uniform fiber size, were prepared directly on a 1.3 inch (3.3 cm) od solid collection mandrel. That is, the elements of this Example differed from those prepared in Example 1 in that they did not contain a central support member or core. The elements, denoted in Table I below as filters D through H, each had constant fiber diameters but from filter to filter the fiber diameter varied from 12.5 micrometers down to 2.5 micrometers, as set out in Table I. A series of five "U-shaped" gauges were prepared with the diameter of the first gauge such that the volume of fiber collected represented one-fifth of the total volume of fiber collected between 1.3 inches (3.3 cm), the id of the formed filter cylinder, and the 2.5 inch (6.35 cm) od of the finished filter cylinder of element. Similarly, the difference in diameter between the second and first gauges—the second having a larger diameter than the first—represented one-fifth of the volume of fiber collected between 1.3 inches (3.3 cm) and 2.5 inches (6.35 cm). In like manner, the difference in diameter between the second and third gauges represented one-fifth of the volume of fiber collected between 1.3 inches (3.3 cm) and 2.5 inches (6.35 cm), etcetera, up through the fifth gauge. Resin flow rate was held constant and, as the filter cylinder diameter increased or built up during formation of each of the elements D through H, the time required to reach the diameter of each of the five gauges was recorded. These times were then used to determine the percent voids volume of each of the five sections of each of the elements, with the results shown in Table I below:

TABLE I

| | | Percent Voids In Section | | | | |
|---|---|---|---|---|---|---|
| Filter | Fiber Diameter micrometers | Inner | 2 | 3 | 4 | Outer |
| D | 12.5 | 84.1 | 83.0 | 80.8 | 80.5 | 80.0 |
| E | 9.0 | 84.3 | 83.7 | 81.8 | 81.3 | 83.0 |
| F | 6.8 | 83.1 | 82.5 | 81.6 | 81.7 | 82.3 |
| G | 4.5 | 84.7 | 83.0 | 82.4 | 81.8 | 82.2 |
| H | 2.5 | 83.5 | 82.1 | 82.8 | 82.7 | 83.8 |

The measurement of voids volume within the fibrous mass (or, in effect, the average density, since the density of the fibers is a constant, i.e., 0.9 grams per cc) by the method described above is not precise. It is believed that the voids volume in the filter elements is uniform or nearly so throughout the thickness of the filter cylinder and that any errors caused by using the averages of these voids volumes is small. Thus, in those Examples reported which are made using a range of fiber diameters on a single element by adjusting the forming roll pressure, the voids volume is believed to be constant throughout the fibrous mass within about 1 to 2 percent.

EXAMPLES 3 THROUGH 12

Preparation of a Constant Voids Volume Cylindrical Filter Structure Profiled to Provide a Wide Range of Pore Diameters by Varying Fiber Diameter Examples 3 through 9 below demonstrate the preparation of constant or near constant voids volume filters with removal ratings varying from less than 1 micrometer up to 40 micrometers. Examples 10, 11 and 12 below show how the data generated in Examples 3 through 9 can be used to prepare graded fiber diameter, constant voids volume filter elements.

Step 1:

A series of supported cylindrical filter structures or elements (Examples 3–9), each with constant or near constant voids volume of 82±1 percent and a uniform fiber diameter, was prepared. While the fiber diameter within an individual element was constant over the series of seven elements formed, the fiber diameters ranged from 1.9 to 12.6 micrometers as set out in Table II below. As also set out in Table II below, the filter elements provided removal ratings in the range of from less than 1 up to 40 micrometers.

These elements were prepared using the general procedure and apparatus of Example 1 but the resin pressure, fiberizing air pressure and the forming roll air pressure were varied in order to obtain fiber diameters spanning the range from 1.9 to 12.6 micrometers as noted in Table II. The average voids volume of each test element was held as closely as possible to 82 percent, the average deviation being less than 0.4 percent. Conditions were controlled to substantially eliminate fiber-to-fiber bonding in the formed elements by the methods described above; most importantly, the fibers were collected on the forming roll rather than the mandrel, and water spray was used when fiber diameter was 2.5 micrometers or greater. Each element was F2 tested and the removal rating (diameter of particles in the incident fluid at which the removal efficiency equalled 99.9 percent) and the dirt capacity (or life) were determined. The preparation conditions and the test results obtained are shown in Table II below. FIGS. 4, 5, 6, 7 and 8 graphically show the relationship of the important parameters of Table II.

TABLE II

Uniform Fiber Diameter Elements
Production Conditions And Performance Data

| Example Number | Forming Roll Air Pressure psi (kg/cm$^2$) | Fiberizing Air Pressure psi (kg/cm$^2$) | Resin Pressure psi (kg/cm$^2$) | Resin Rate grams/ second | Cooling Water Flow cc/min. | Fiber Diameter micrometers | Removal Rating micrometers | Dirt Capacity or Life grams |
|---|---|---|---|---|---|---|---|---|
| 3 | 50 (3.52) | 50 (3.52) | 300 (21.1) | 1.29 | Off | 1.9 | <0.1 | 6.6 |
| 4 | 45 (3.16) | 60 (4.22) | 500 (35.2) | 1.71 | 124 | 2.5 | 2.1 | 8.3 |
| 5 | 30 (2.11) | 60 (4.22) | 625 (43.9) | 1.88 | 124 | 2.9 | 3.1 | 8.8 |
| 6 | 20 (1.41) | 30 (2.11) | 625 (43.9) | 1.90 | 124 | 4.4 | 5.7 | 10.1 |
| 7 | 15 (1.05) | 16 (1.12) | 625 (43.9) | 1.84 | 124 | 6.2 | 11.0 | 15.0 |
| 8 | 10 (0.70) | 9 (0.63) | 625 (43.9) | 1.85 | 124 | 9.0 | 18.0 | 23.3 |
| 9 | 8 (0.56) | 5 (0.35) | 625 (43.9) | 1.80 | 124 | 12.6 | 40.0 | 82.0 |

Step 2:

FIGS. 4 through 7 can be used used to prepare an operating plan which will make filter elements with any combination of fiber diameters between 1.9 and 12.6 micrometers.

In general, it is preferred to construct elements in which the liquid being filtered will flow from the outside of the elements toward the inside and then exit through the filter core (an outside/in configuration). However, in some circumstances, for example, when it is desired to retain the collected solids within the filter cartridge, the direction can be reversed (inside/out configuration). In either case, it is generally advantageous to have the pores profiled from large at the upstream side to small at the downstream side by providing fibers of decreasing diameter in a graded or profiled manner in the direction of fluid flow, i.e., in the radial direction, while maintaining the voids volume substantially constant.

The configuration of the profile can vary widely. In some applications it may be desirable to have the upstream portion of the filter graded with the downstream portion of uniform pore size. Alternatively, especially if intended for use as a prefilter, the entire thickness of the fibrous portion of the filter can be varied in an appropriate profile with the largest pores upstream to the smallest pores downstream. Example 10 illustrates a filter of the latter type in which progressively larger fiber diameters are used as the filter is built up. In Example 10, the fiber diameters are varied as a geometric progression. Varying the fiber diameters as a geometric progression is believed to provide a filtering element well adapted to a wide variety of non-specific applications. For any specific applications, other schemes can be used, for example, linear, square root, or logarithmic, etcetera. Alternatively, the fiber diameters can be graded in a continuous manner without discrete steps in the radial direction, a form of gradation referred to herein as "continuously profiled".

EXAMPLE 10

Element Made With Constant Voids Volume and Varying Fiber Diameter Throughout

Figure 4:
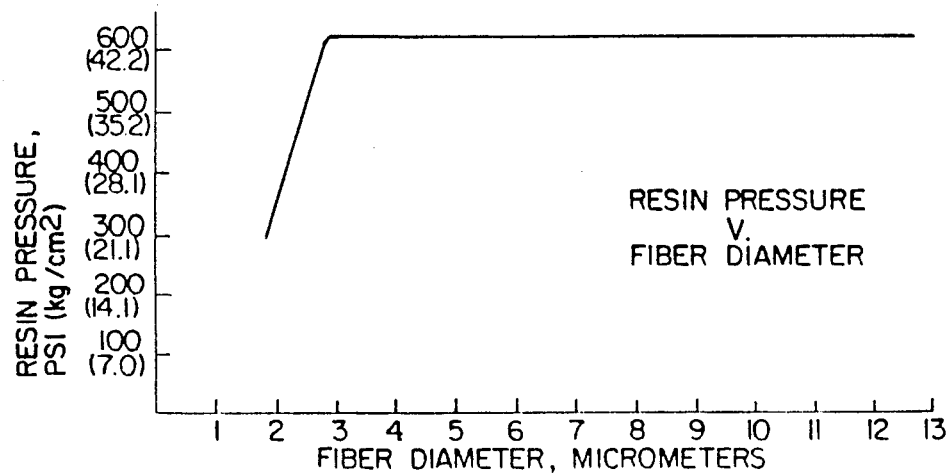
FIG. 4 is a graph of resin (or polymeric material) pressure versus fiber diameter.
Figure 5:
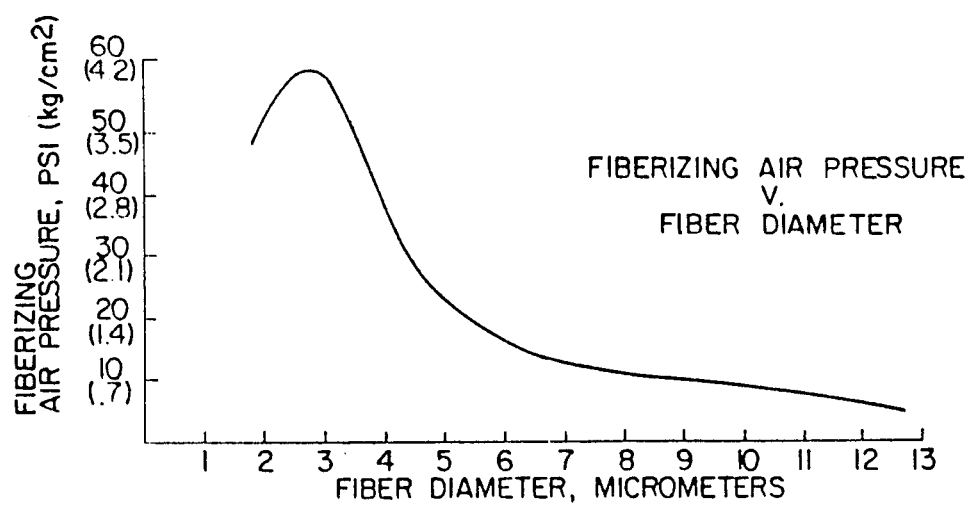
FIG. 5 is a graph of fiberizing air pressure versus fiber diameter.
Figure 6:
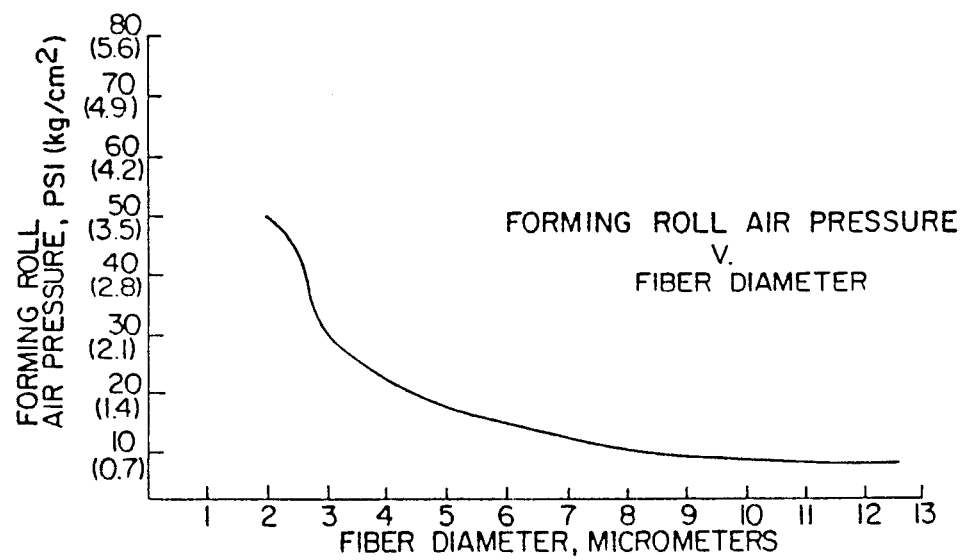
FIG. 6 is a graph of forming roll air pressure versus fiber diameter.
Figure 7:
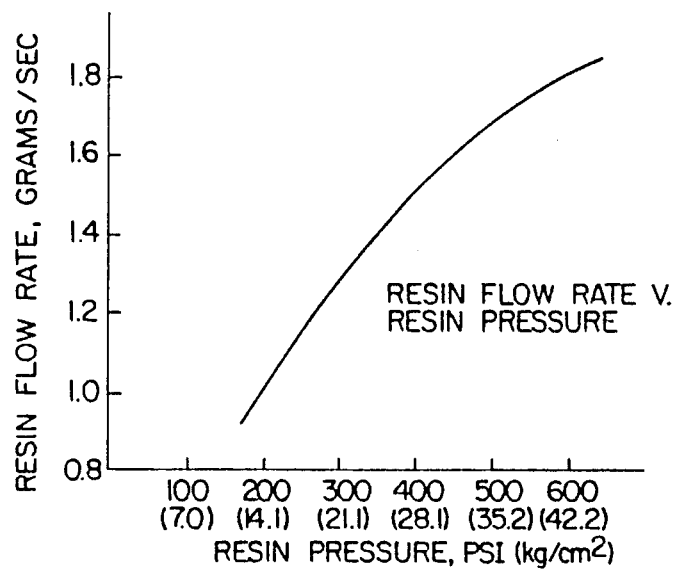
FIG. 7 is a graph of resin rate versus resin pressure.

Using the general procedure and apparatus of Example 1, the data of FIGS. 4 through 7 (generated in Examples 3 through 9) were used as follows:

(a) the total volume of the fibrous portion of the filter element to be formed (2.5 inches (6.35 cm) od × 1.30 inches (3.30 cm) id × 9.8 inches (24.9 cm) long) was divided into 15 equal incremental volumes;

(b) the fiber diameter range from 1.9 to 12.6 micrometers was then divided into 14 steps of increasing fiber diameter, each fiber diameter being 14.447 percent larger than the preceding one, the first being 1.9 micrometers and the last 12.6 micrometers (this forming a geometric progression of fiber diameters as set out in Table III below);

(c) the operating conditions required to obtain the 15 fiber diameters set out in Table III below were then read from FIGS. 4, 5 and 6.

In this Example, the filter is designed to have an equal incremental volume of the fibrous mass at each of the selected fiber diameters. Because the voids volume is constant within experimental error at 82 percent and the density is therefore correspondingly constant, it was required that an equal weight of the mirofibers be deposited in each of the 15 incremental volumes. Since the resin rate is a function of the fiber diameter, FIG. 7 was used to calculate the time required to deposit an equal weight in each of the incremental volumes. The result was the operating program set out in Table III below.

TABLE III

| Fiber Diameter Micrometer | Time Interval Seconds | Time Cumulative Seconds | Resin Pressure psi (kg/cm$^2$) | Fiberizing Air Pressure psi (kg/cm$^2$) | Forming Roll Air Pressure psi (kg/cm$^2$) |
|---|---|---|---|---|---|
| 1.9 | 23 | 23 | 300 (21.1) | 50 (3.52) | 50 (3.52) |
| 2.2 | 19 | 42 | 410 (28.8) | 56 (3.94) | 49 (3.45) |
| 2.5 | 17 | 59 | 500 (35.1) | 60 (4.22) | 45 (3.16) |
| 2.9 | 16 | 75 | 625 (43.9) | 60 (4.22) | 30 (2.11) |
| 3.3 | 16 | 91 | 625 (43.9) | 54 (3.80) | 27 (1.90) |
| 3.7 | 16 | 107 | 625 (43.9) | 45 (3.16) | 24 (1.69) |
| 4.3 | 16 | 123 | 625 (43.9) | 31 (2.18) | 21 (1.48) |
| 4.9 | 16 | 139 | 625 (43.9) | 24 (1.69) | 18 (1.27) |
| 5.6 | 16 | 155 | 625 (43.9) | 19 (1.34) | 16 (1.12) |
| 6.4 | 16 | 171 | 625 (43.9) | 14 (0.98) | 14 (0.98) |
| 7.4 | 16 | 187 | 625 (43.9) | 12 (0.84) | 12 (0.84) |
| 8.4 | 16 | 203 | 625 (43.9) | 10.5 (0.74) | 10.5 (0.74) |
| 9.6 | 16 | 219 | 625 (43.9) | 9.5 (0.67) | 9 (0.63) |
| 11.0 | 16 | 235 | 625 (43.9) | 7.5 (0.52) | 8 (0.56) |

TABLE III-continued

| Fiber Diameter Micrometer | Time Interval Seconds | Time Cumulative Seconds | Resin Pressure psi (kg/cm$^2$) | Fiberizing Air Pressure psi (kg/cm$^2$) | Forming Roll Air Pressure psi (kg/cm$^2$) |
|---|---|---|---|---|---|
| 12.6 | 16 | 251 | 625 (43.9) | 5 (0.35) | 7 (0.49) |

The 9.8 inch (24.9 cm) long filter element, prepared as described above, on a 1.1 inch (2.79 cm) id × 1.3 inch (3.30 cm) od × 9.8 inch (24.9 cm) long core, had an od of 2¼ inches (6.35 cm), i.e., the fibrous mass had an inside diameter of 1.3 inches (3.30 cm) and an outside diameter of 2¼ inches (6.35 cm). The filter element exhibited the following properties:

Clean pressure drop was 1.8 psi (0.13 kg/cm$^2$) at 10 liters of water per minute. The life or dirt capacity was 83 grams to 60 psi (4.22 kg/cm$^2$) differential pressure; filtration efficiency was in excess of 90 percent at 1.0 micrometer, 99 percent at 3.7 micrometers, 99.9 percent at 5 micrometers and 99.99 percent at 5.6 micrometers; bacteria removal efficiency tested using 0.3 micrometer diameter Pseudomonas diminuta (Ps. d) organism was 99.997 percent.

Because of its very high dirt capacity (long life) and removal capability over the full range of particle diameters from 0.1 to 40 micrometers, this type of filter is particularly well suited as a prefilter. For example, it could be used to precede an absolute rated final filter when used in critical applications, such as sterilization of parenterals or for providing water for use in the manufacture of microelectronic devices. Because of its wide range capability, it would also serve well as a prefilter for a coarser after filter, for example, one rated at 5 or 10 micrometers. It can also be used as the only filter in the system for many other applications.

EXAMPLE 11

Filter Element With Constant Fiber Diameter of 1.9 Micrometers for the Inner 50 Percent of the Fibrous Portion of the Element and Varying Fiber Diameter for the Outer 50 Percent, With Constant Voids Volume Throughout The filter element of this Example was prepared in the same general manner as that of Example 10 and, as with the filter element of Example 10, had a voids volume of 82 percent but differed from Example 10 in that the initial 50 percent by weight of the fibrous portion of the element was made up of fibers having a constant diameter of 1.9 micrometers with the balance varied, again as a geometric progression, from 1.9 to 12.6 micrometers. This was accomplished by the operating program set out in Table IV below.

TABLE IV

| Fiber Diameter Micrometer | Time Interval Seconds | Time Cumulative Seconds | Resin Pressure psi (kg/cm$^2$) | Fiberizing Air Pressure psi (kg/cm$^2$) | Forming Roll Air Pressure psi (kg/cm$^2$) |
|---|---|---|---|---|---|
| 1.9 | 182 | 182 | 300 (21.1) | 50 (3.52) | 50 (3.52) |
| 2.2 | 11 | 193 | 410 (28.8) | 56 (3.94) | 49 (3.45) |
| 2.5 | 9 | 202 | 500 (35.1) | 60 (4.22) | 45 (3.16) |
| 2.9 | 8 | 210 | 625 (43.9) | 60 (4.22) | 30 (2.11) |
| 3.3 | 9 | 219 | 625 (43.9) | 54 (3.80) | 27 (1.90) |
| 3.7 | 8 | 227 | 625 (43.9) | 45 (3.16) | 24 (1.69) |
| 4.3 | 9 | 236 | 625 (43.9) | 31 (2.18) | 21 (1.48) |
| 4.9 | 8 | 244 | 625 (43.9) | 24 (1.69) | 18 (1.27) |
| 5.6 | 9 | 253 | 625 (43.9) | 19 (1.34) | 16 (1.12) |
| 6.4 | 8 | 261 | 625 (43.9) | 14 (0.98) | 14 (0.98) |
| 7.4 | 9 | 270 | 625 (43.9) | 12 (0.84) | 12 (0.84) |
| 8.4 | 8 | 278 | 625 (43.9) | 10.5 (0.74) | 10.5 (0.74) |
| 9.6 | 9 | 287 | 625 (43.9) | 9.5 (0.67) | 9 (0.63) |
| 11.0 | 8 | 295 | 625 (43.9) | 7.5 (0.53) | 8 (0.56) |
| 12.6 | 9 | 304 | 625 (43.9) | 5 (0.35) | 7 (0.49) |

The resulting element had the same id, od and length as that of Example 10. It exhibited the following properties:

Clean pressure drop: 4.3 psi (0.30 kg/cm$^2$) at a test flow rate of 10 liters of water per minute;

Life or dirt capacity: 36 grams to 60 psi (4.22 kg/cm$^2$) differential pressure;

Filtration efficiency: in excess of 99 percent at 0.7 micrometer (as estimated by extrapolation), measured as 99.9 percent at 1.4 micrometers, as 99.99 percent at 2.2 micrometers, and as 99.999 percent at 3 micrometers.

Because of its very high efficiency at 2.2 micrometers, this filter element can, for nearly all purposes, be rated as 2.2 micrometers absolute. It also provides very useful levels of removal for particles as fine as 0.7 micrometer. These high efficiencies, coupled with the very high dirt capacity of 36 grams under the F2 test as described above, provides a highly useful filter with a long service life.

It should also be noted that while the efficiency of this filter element is finer than that of Example 4, its service life (dirt capacity) is over 4 times higher and, indeed, is equal to the service life of a uniform pore filter with a removal rating of about 20 micrometers at 99.9 percent efficiency.

In order to further characterize this ultrafine, long lived filter element, an element made in a similar manner was tested by passing through it a suspension of Pseudomonas diminuta bacteria. This organism is cylindrical in shape, with a diameter of 0.3 micrometer. Efficiency of removal was 99.997 percent.

Elements made in the manner as described above are well suited for the filtration of a variety of products from which yeast and bacteria are to be removed, yielding not only a liquid effluent free of or greatly reduced in its content of yeast and bacteria, but also one with high clarity.

EXAMPLE 12

Filter Element With Constant Fiber Diameter of 2.9 Micrometers for the Inner 59 Percent of the Fibrous Mass, and Varying Fiber Diameters for the Outer 41 Percent, With Constant Voids Volume of 82 Percent Throughout The filter element of this Example was prepared in the general manner of Example 10. However, the initial 59 percent by weight of the fibrous portion of the supported filter element of this Example had fibers with diameters of 2.9 micrometers with the balance varied as a geometric progression from 2.9 to 12.6 micrometers. This was accomplished by the operating program set out in Table V below:

TABLE V

| Fiber Diameter Micrometer | Time Interval Seconds | Time Cumulative Seconds | Resin Pressure psi (kg/cm$^2$) | Fiberizing Air Pressure psi (kg/cm$^2$) | Forming Roll Air Pressure psi (kg/cm$^2$) |
|---|---|---|---|---|---|
| 2.9 | 138 | 138 | 625 (43.9) | 60 (4.22) | 30 (2.11) |
| 3.3 | 8 | 146 | 625 (43.9) | 54 (3.80) | 27 (1.90) |
| 3.7 | 9 | 155 | 625 (43.9) | 45 (3.16) | 24 (1.69) |
| 4.3 | 8 | 163 | 625 (43.9) | 31 (2.18) | 21 (1.48) |
| 4.9 | 9 | 172 | 625 (43.9) | 24 (1.69) | 18 (1.27) |
| 5.6 | 8 | 180 | 625 (43.9) | 19 (1.34) | 16 (1.12) |
| 6.4 | 9 | 189 | 625 (43.9) | 14 (0.98) | 14 (0.98) |
| 7.4 | 8 | 197 | 625 (43.9) | 12 (0.84) | 12 (0.84) |
| 8.4 | 9 | 206 | 625 (43.9) | 10.5 (0.74) | 10.5 (0.74) |
| 9.6 | 8 | 214 | 625 (43.9) | 9.5 (0.67) | 9 (0.63) |
| 11.0 | 9 | 223 | 625 (43.9) | 7.5 (0.53) | 8 (0.56) |
| 12.6 | 8 | 231 | 625 (43.9) | 5 (0.35) | 7 (0.49) |

The filter element of this Example was prepared by the general procedure described in Example 11 above and had the same id, od and length as the element of Example 11. It exhibited the following properties:

Clean pressure drop: 1.5 psi (0.11 kg/cm$^2$) at a test flow rate of 10 liters per minute of water;
Life or dirt capacity: 53 grams;
Filtration efficiency: 90 percent at 1.1 micrometers, 99.9 percent at 4.6 micrometers and 99.99 percent at 5.8 micrometers.

Filters of the type of this Example have applications in fields such as filtration of magnetic particle suspensions used for video recording tape manufacture and for processing photographic film emulsions.

EXAMPLE 13

Filter With Fiber Diameters Varying From 8.5 to 12.5 Micrometers

Using a procedure similar to that of Example 10 but starting with 8.5 micrometer diameter fibers, a filter element was prepared which had the following properties:

Life or dirt capacity: 115 grams up to a pressure drop of 0.6 psi (0.042 kg/cm$^2$) with a removal rating of 24 micrometers. The 115 gram life to 0.6 psi (0.042 kg/cm$^2$) is very much higher when compared with the best commercially available filters of equal removal rating which use a varying density structure, as opposed to a substantially uniform voids volume and corresponding substantially uniform density with a varying or graded fiber diameter structure.

EXAMPLES 14 THROUGH 17

A number of filters have been described in the literature which seek to obtain increased life or dirt capacity using fibers of uniform diameter by varying the pore diameters from larger upstream to smaller downstream by decreasing the voids volume, i.e., increasing the density, of the filter medium in a progressive manner. The characteristics to be expected of such a filter can be projected using the test results obtained in the following Examples 14 through 17.

The filter elements of this group of Examples were made in the same general manner as Example 1. Each was prepared with uniform fiber diameter of 3.2 micrometers and with uniform voids volume in each element. However, the voids volume varied from one element to the next, as noted in Table VI below.

TABLE VI

| Example Number | Resin Pressure psi (kg/cm$^2$) | Fiberizing Air Pressure psi (kg/cm$^2$) | Forming Roll Air Pressure psi (kg/cm$^2$) | Voids Volume Percent | Life grams | Removal Rating micrometers |
|---|---|---|---|---|---|---|
| 14 | 500 (35.2) | 40 (2.81) | 60 (4.22) | 79.3 | 7.9 | 1.7 |
| 15 | 500 (35.2) | 40 (2.81) | 45 (3.16) | 81.2 | 6.9 | 1.7 |
| 16 | 500 (35.2) | 40 (2.81) | 25 (1.76) | 83.9 | 9.6 | 2.2 |
| 17 | 500 (35.2) | 40 (2.81) | 10 (0.70) | 88.1 | 10.3 | 3.8 |

It may be deduced from the above data that if one were to make a composite filter, with voids volume graduated from 79 to 88 percent, its life would be not better than 10.3 grams under the F2 test. Further, its removal rating would be somewhere between 1.7 and 3.8 micrometers. These characteristics, when compared with the data of Examples 10-12, show that an element made with a constant voids volume, but with varying fiber diameter, would have at least four times the life or dirt capacity at equal efficiency.

The conclusion that far better life can be obtained using constant voids volume with varying fiber diameter, as opposed to constant fiber diameter and varying voids volume (or density), is also supported by similar data (not presented herein) at fiber diameters other than 3.2 micrometers.

EXAMPLES 18 THROUGH 21

The same conclusions regarding the inferiority of the approach of varying the voids volume or density to obtain a graded pore structure vis-a-vis varying the fiber diameter while maintaining a substantially uniform voids volume is also supported by the subject Examples 18–21. The filter elements of Examples 18–20 were prepared on 1.3 inch (3.3 cm) od cores. In each of Examples 18, 19 and 20, the fiber deposited between 1.3 inches (3.3 cm) diameter and 2.1 inches (5.3 cm) diameter was identical, i.e., the fiber diameter used was 3.2 micrometers. The voids volume of this portion of all three Examples was 83 percent.

For the filter element of Example 18, the deposition of fibers was terminated at the 2.1 inches (5.3 cm) diameter.

The filter element of Example 19 was graded or profiled between 2.1 inches (5.3 cm) diameter and 2.5 inches (6.35 cm) diameter by varying the diameter of the fiber from 3.2 micrometer to 12.5 micrometer diameter in the manner of Examples 11 and 12 while maintaining the voids volume constant at 83 percent.

The filter element of Example 20 was profiled between 2.1 inches (5.3 cm) diameter and 2.5 inches (6.35 cm) diameter by increasing the voids volume from 83 to over 90 percent while maintaining the fiber diameter constant at 3.2 micrometers.

As indicated in Table VII below, Example 21 was prepared in the same manner as Example 20 except that the fiber diameter was 3.6 micrometers throughout.

The characteristics of the four elements of Examples 18–21 are set out in Table VII below:

TABLE VII

| Example Number | Outside Diameter of Element inches (cm) | Character Of 1.3 to 2.1 inches Diameter (3.3 to 5.3 cm Diameter) | Character Of 2.1 to 2.5 inches Diameter (5.3 to 6.35 cm Diameter) | Life grams | Removal Rating micrometers |
|---|---|---|---|---|---|
| 18 | 2.1 (5.3) | Uniform (83%) Voids 3.2 Micrometer Fiber Diameter | Terminated At 2.1 inch (5.3 cm) Diameter | 8 | 3.6 |
| 19 | 2.5 (6.35) | Uniform (83%) Voids 3.2 Micrometer Fiber Diameter | Fiber Diameter Profiled From 3.2 to 12.5 Micrometers While Maintaining Uniform Voids Volume | 48 | 2.8 |
| 20 | 2.5 (6.35) | Uniform (83%) Voids 3.2 Micrometer Fiber Diameter | Voids Volume Profiled from 83 to 90 Percent While Maintaining Fiber Diameter Constant at 3.2 Micrometer | 12 | 2.6 |
| 21 | 2.5 (6.35) | Uniform (83%) Voids 3.6 Micrometer Fiber Diameter | Voids Volume Profiled from 83 to 90 Percent While Maintaining Fiber Diameter Constant at 3.6 Micrometer | 12 | 4.1 |

In Examples 19 and 20, voids volumes above 90 percent were not used because they were deemed too soft and compressible to be practical.

From the data set out in Table VII and by interpolating between Examples 20 and 21, it may be seen that this type of element, if made with a fiber diameter such as to yield a removal rating of 2.8 micrometers, i.e., equal to that of Example 19, would have a dirt capacity of only about 12 grams or about one-quarter that of Example 19.

EXAMPLES 22 THROUGH 24

The filter elements of these Examples were made in a manner similar to that of Example 12 except that the starting fiber diameters varied from 3.2 to 4.8 micrometers instead of the 2.9 micrometers of Example 12. The resulting structures had voids volumes of 82 percent and the characteristics set out in Table VIII below:

TABLE VIII

| Example Number | Starting Fiber Diameter, Micrometers | Life Grams | Removal Rating, Micrometers |
|---|---|---|---|
| 22 | 3.2 | 52 | 9 |
| 23 | 4.0 | 67 | 12 |
| 24 | 4.8 | 63 | 14 |

EXAMPLES 25 THROUGH 28

Filter Element Series Illustrating Effect of Variation of Voids Volume

A series of 2½ inch (6.35 cm) od × 1.1 inch (2.79 cm) id × 9.8 inch (24.9 cm) long filter elements were prepared at conditions such as to produce 2.2 micrometer fibers. By varying the water spray rate and the forming roll pressure, voids volume was varied from 72.1 percent to 91.8 percent.

The properties of the resulting filters are set out in Table IX below:

TABLE IX

| Example Number | Voids Volume | Life Grams | Removal Rating, Micrometers, At Efficiency of 99.99% |
|---|---|---|---|
| 25 | 72.1 | 4.6 | 0.5 |
| 26 | 80.6 | 5.6 | 1.4 |
| 27 | 87.3 | 6.2 | 3.0 |
| 28 | 91.8 | 10.9 | 4.6 |

The dirt capacity of Examples 25 through 28 was plotted as the ordinate against the 99.99 percent removal rating as the abscissa and a line drawn through the four experimental points. On this line it was seen that the dirt capacity of a filter made in the manner of Examples 25-28 with 99.99 percent efficiency at 2.2 micrometers would have a dirt capacity of 5.9 grams. This is in marked contrast to the dirt capacity of the filter element of Example 11, which had a 99.99 percent efficiency at 2.2 micrometers but a dirt capacity of 36 grams, i.e., six times greater.

EXAMPLES 29 THROUGH 34

Filtering Element Series Illustrating the Effect of Variation of Voids Volume or Density A series of filter elements similar to those of Examples 25 through 28 was prepared using fibers having 12.5 micrometer diameters and with voids volumes varied from 63.6 to 89.8 percent.

The characteristics of the elements are set out in Table X below:

TABLE X

| Example Number | Voids Volume | Life Grams | Removal Rating, Micrometers, At Efficiency Of | |
|---|---|---|---|---|
| | | | 99.9% | 99.99% |
| 29 | 63.6 | 12 | 14 | 20 |
| 30 | 69.7 | 32 | 18 | 23 |
| 31 | 74.6 | 55 | 25 | — |
| 32 | 80.6 | 79 | 38 | 48 |
| 33 | 85.8 | 76 | 53 | — |
| 34 | 89.8 | (1) | (2) | — |

(1) 105 grams to 15 psid (1.05 kg/cm$^2$ difference)
(2) 90 percent efficiency at 68 micrometers When the above elements are compared with elements of equal efficiency made by the process of this invention, life is seen to be much higher for the latter. To illustrate this, Example 29 above may be compared to Example 13 when both are tested with a glass bead contaminant suspended in MIL-H-5606 hydraulic fluid. They have virtually identical removal ratings of 14 and 15 micrometers, respectively, at 99.9 percent efficiency. However, the dirt capacity of Example 13 is 42 grams versus only 12 grams for Example 29 (when tested to 60 psi (4.2 kg/cm$^2$) pressure drop).

EXAMPLES 35 THROUGH 37

This group of Examples compares the collapse pressures of a filter element made with interfiber bonding induced by use of molten or softened fibers (Example 35) with filter elements made using fibers substantially free of this type of interfiber bonding (Examples 36 and 37).

Example 35 is a purchased specimen of a commercially available Hytrex brand filter (available from Osmonics, Inc.) made using polypropylene fibers and which is characterized by the presence of very strong interfiber bonding. On examination, the bonding was seen to be caused by the adhesion to each other of melted or softened fibers to form a coherent mass. Example 35 had no internal support core. Examples 36 and 37 were prepared by the procedure of this invention, also with no support cores. Collapse pressures were determined by individually wrapping the outside of each of the test elements with a thin water-impervious plastic film, sealing the ends of the element and then applying pressure to the exterior of the element with water in a transparent housing so that the failure of the element could be observed.

The dimensions, rating, voids volume and collapse pressure for each element are set out below:

EXAMPLE 35

Hytrex 20 micrometer element, 2.75 inch (7 cm) od × 1⅜ inch (3.5 cm) id × 10 inch (25.4 cm) long, average voids volume 76.7 percent. Collapse pressure was 80 psid (5.63 kg/cm$^2$).

EXAMPLE 36

A twenty micrometer rated element was made by the process of this invention, 2.75 inch (7 cm) od × 1⅜ inch (3.5 cm) id × 10 inch (25.4 cm) long with no support core. Voids volume was 75 percent. Collapse pressure was 16 psid (1.13 kg/cm$^2$).

EXAMPLE 37

The element of this Example was similar to that of Example 36 except that the voids volume was 81.5 percent. Collapse pressure was 5 psid (0.35 kg/cm$^2$).

The much lower collapse pressures of the elements of this invention are due to the substantial absence of interfiber bonding. Conversely, the Hytrex element was sufficiently strengthened by interfiber bonding that it had the necessary strength to withstand up to 80 psid (5.63 kg/cm$^2$).

EXAMPLES 38 AND 39

Nylon 6 resin was fed into the same apparatus and processed in the same general manner as previously described using polypropylene. The operating conditions and properties of the resulting elements (when tested using the F2 test) are described below

| | Example 38 | Example 39 |
|---|---|---|
| Resin Temperature Degrees F. | 693 | 693 |
| (Degrees C.) | (417) | (417) |
| Resin Pressure, psi | 300 | 300 |
| (kg/cm$^2$) | (21) | (21) |
| Fiberizing Air Pressure, psi | 40 | 12 |
| (kg/cm$^2$) | (2.8) | (0.84) |
| Fiber Diameter, micrometers | 2.3 | 4.0 |
| Voids Volume, Percent | 80.5 | 74.9 |
| Removal Rating, micrometers | 5.0 | 6.1 |
| Life, grams | 12.2 | 10.2 |

EXAMPLE 40

Filter elements are prepared in accordance with the invention in a similar manner to the polypropylene elements previously described, but the resin used is polymethylpentene. The properties and characteristics of the products are very similar to those obtained using polypropylene.

EXAMPLE 41

A filter element made in the manner of Example 25 was tested by passing through it 1,000 ml of a suspension of Pseudomonas diminuta (Ps d), a 0.3 micrometer bacterium, in water. The effluent was analyzed for its content of this bacterium. Whereas the total number of bacteria in the influent was $2.3 \times 10^{12}$, the effluent content was found to be $1.6 \times 10^5$, indicating a reduction by a factor of $1.4 \times 10^7$. This corresponds to an efficiency of 99.99999 percent.

EXAMPLE 42

Two filter elements (42A and 42B) were made in a manner generally similar to Example 11 except that the inner 50 percent of this element consisted of 1.7 micrometer diameter fibers and the outer 50 percent was profiled up to 12.5 micrometer fiber diameter. Both filters were tested with Ps d in the same manner as in Example 41 and, in addition, were resterilized and retested using Serratia marcescens (Serr m) as the test organism. The results are shown in Table XI below.

TABLE XI

| Exam- | Upstream | | Downstream | | Efficiency | |
|---|---|---|---|---|---|---|
| ple | Ps d | Serr m | Ps d | Serr m | Ps d | Serr m |
| 42A | $1.2 \times 10^{12}$ | $4.8 \times 10^{10}$ | $4.5 \times 10^9$ | $1.1 \times 10^7$ | 99.6 | 99.98 |
| 42B | $1.2 \times 10^{12}$ | $4.8 \times 10^{10}$ | $4.3 \times 10^8$ | $6.9 \times 10^5$ | 99.96 | 99.999 |

EXAMPLE 43

The general procedure of Example 10 is repeated except that the variation of the resin flow rate, of the fiberizing air flow rate and of the forming roll pressure is continuous as opposed to stepwise, producing a filter element with a continuously graded fiber diameter structure, i.e., a continuously profiled structure, with characteristics comparable to those of the filter element of Example 10.

EXAMPLE 44

Filter elements are prepared in accordance with the invention and in a similar manner to the polypropylene elements previously described, but the resin used is polybutylene terephthalate (PBT). The properties and characteristics of the products are similar to those obtained using polypropylene. However, because of the higher melting point of PBT and its resistance to hydrocarbons, filter elements prepared from PBT will be useful at higher temperatures and in service where they will come in contact with hydrocarbons which might cause the polypropylene fibers to swell.

EXAMPLE 45

Relative Compressibility of Course and Fine Fibers

Filter elements were prepared with essentially uniform fiber diameter throughout in the manner of Example 1, differing only with respect to fiber diameter. Using a tool resembling a laboratory cork borer having an inside diameter of 0.58 inches (1.473 cm), specimens were cut from the fibrous portion of each filter element perpendicular to the longitudinal axis of the element, forming a generally cylindrical specimen about 0.6 inches (1.52 cm) in length and about 0.58 inches (1.47 cm) in diameter.

Measured forces of 10 psi (1.7 kg/cm$^2$), 20 psi (1.4 kg/cm$^2$), 60 psi (4.22 kg/cm$^2$), 90 psi (6.33 kg/cm$^2$) and 120 psi (8.44 kg/cm$^2$) were individually and sequentially applied to the ends of each of the cylinders while the thickness of the cylinders at each level of applied force was simultaneously measured.

Three elements with fiber diameters of 2.0, 6.8 and 12 micrometers were each individually tested in this manner. The decrease in thickness of each, when plotted against force applied, was very similar for all three fiber diameters.

EXAMPLE 46

Collapse of Filter Element When Used With High Viscosity Fluids at High Flow Rates Two filter elements 46A and 46B were prepared using identical procedures in a manner generally similar to Example 24 except that the average voids volume was 2 percent lower (80 percent cf 82 percent). Element 46A was tested using the F2 method described above at 10 liters/minute of water. It had a removal rating of 11.2 micrometers and a dirt capacity of 53 grams. The clean pressure drop, prior to the test, was 0.7 psi (0.05 kg/cm$^2$) at ambient temperature of 20 to 25 degrees F. (6.67 to 3.89 degrees C.).

Element 46B was placed in an F2 test stand which used hydraulic fluid MIL-H-5606 at 100 degrees F. (37.8 degrees C.). At this temperature the viscosity of MIL-H-5606 is 12.7 centipoise or 12.7 times that of water. No test contaminant was added to the system, instead clean fluid was flowed through the element at the flow rates set out in Table XII below.

TABLE XII

| Flow Of MIL-H-5606 Liters/Minute | Pressure Drop psi (kg/cm$^2$) |
|---|---|
| 1 | 1.3 (.09) |
| 4 | 11.0 (.77) |
| 7 | 25.5 (1.79) |
| 10 | 46.5 (3.27) |
| 13 | cartridge failed due to core collapse at approximately 80 psi (5.63 kg/cm$^2$) |

The pressure drop through the filter elements of this invention is proportional to flow and to viscosity. Based on the aqueous pressure drop at 10 liters/minute of 0.7 psi (0.05 kg/cm$^2$), the calculated pressure drops for MIL-H-5606 are 8 psi (0.56 kg/cm$^2$) at 10 liters/minute (vs. 46.5 psi (3.27 kg/cm$^2$) measured) and about 11 psi (0.77 kg/cm$^2$) at 13 liters/minute (vs. approximately 80 psi (5.62 kg/cm$^2$) measured).

The much higher pressure drops when using the viscous fluid are due to the compression of the filter medium. This example illustrates that use of excessively high voids volumes is not desirable for applications in which high flow of viscous fluids at high pressure drop are involved, particularly with the finer grades of filter element.

EXAMPLE 47

Filter Element With the Inner Two-Thirds With Voids Volume of 74 Percent and the Outer One-Third Profiled in Fiber Diameter to 12.5 Micrometers Also at 74 Percent Voids Volume A filter element is prepared using the general procedure of Example 11 modified as follows:

The initial 67 percent by weight of the fibrous mass of the element is made up of 1.6 micrometer diameter fibers prepared using a water spray coolant and with the forming roll air pressure adjusted to obtain a voids volume of 74 percent. The outer 33 percent by weight of the fibrous mass of the element is applied also using a water spray coolant but while adjusting the resin rate, fiberizing air pressure and the forming roll pressure in a manner such as to profile the fiber diameter in a continuous manner from 1.6 to 12.5 micrometers while maintaining a uniform voids volume of 74 percent. The resulting filter element will have a titre reduction in excess of $10^7$ (99.99999 percent efficiency) when tested using 0.3 micrometer diameter Psuedomonas diminuta organisms and will have a much higher dirt capacity than a similar cylindrical filter element in which 100 percent of the weight of the weight of the fibrous mass is made up of 1.6 micrometer fibers with a 74 percent voids volume.

EXAMPLE 48

Filter Element With the Inner Two-Thirds With Voids Volume of 74 Percent and the Outer One-Third Profiled in Both Fiber Diameter and Voids Volume, Respectively, up to 12.5 Micrometers and 85 Percent Voids Volume A filter element is prepared using the general procedure of Example 47 but modified as follows:

The outer 33 percent by weight of the fibrous mass of the element is applied also using a water spray coolant while adjusting the resin rate, fiberizing air pressure, and forming roll pressure in a manner such as to profile both the fiber diameter and the voids volume simultaneously, both in continuous fashion. The fiber diameter is profiled from 1.6 up to 12.5 micrometers at the od and the voids volume is profiled from 74 percent up to 85 percent.

The resulting filter element, when tested for efficiency using the Pseudomonas diminuta bacteria, will have an efficiency essentially equal to that of Example 47 but with a somewhat higher dirt capacity.

Industrial Applicability

The cylindrical fibrous structures of the subject invention find use in a variety of filtration applications. The filter elements of the subject invention combine extended filter life, i.e., higher dirt capacity, at equal efficiency, or better efficiency at equal life, or both better efficiency and higher dirt capacity than previously available commercial fibrous cylindrical depth filters. A combination of high dirt capacity (long life) and removal capacities over a wide range of particle diameters makes filter elements of this invention useful as prefilters, for example, to precede an absolute rated final filter when used in critical applications, such as sterilization of parenterals or for providing water for use in the manufacture of microelectronic devices.

Filter elements of this invention are also well suited for the filtration of a wide variety of products from which yeast and bacteria are to be removed, yielding not only a liquid effluent free of or greatly reduced in its content of yeast and bacteria, but also one with high clarity. Filter elements of this invention may also be used where high titre reductions, coupled with high dirt capacities, are required for removal of bacteria.

In addition to their primary use as depth filters with high efficiency and extended life, the cylindrical fibrous structures of this invention also find use as coalescers and in insulation applications.

We claim:

1. A cylindrical fibrous structure comprising a fibrous mass of nonwoven, synthetic, polymeric microfibers, said microfibers substantially free of fiber-to-fiber bonding and secured to each other by mechanical entanglement or intertwining, and said fibrous mass having a substantially constant voids volume and varying fiber diameter over at least a substantial portion thereof as measured in the radial direction to achieve a graded pore size over said portion.

2. The cylindrical fibrous structure of claim 1 wherein said fibrous mass has a voids volume in the range of from about 60 to about 95 percent.

3. The cylindrical fibrous structure of claim 2 wherein said fibrous mass has a voids volume in the range of from about 64 to about 93 percent and said microfibers have diameters in the range of from about 1.5 to about 20 micrometers.

4. The cylindrical fibrous structure of claim 3 wherein said fibrous mass has a voids volume in the range of from about 75 to about 85 percent and said microfibers have diameters in the range from about 1.9 to about 12.6 micrometers.

5. The cylindrical fibrous structure of claim 1 wherein said nonwoven, synthetic, polymeric microfibers are comprised of a thermoplastic selected from the class consisting of polyolefins, polyamides and polyesters.

6. The cylindrical fibrous structure of claim 5 wherein said thermoplastic is polypropylene.

7. The cylindrical fibrous structure of claim 1 wherein said fibrous mass has a substantially constant voids volume throughout as measured in the radial direction.

8. The cylindrical fibrous structure of claim 1 wherein said fibrous mass has a continuously graded fiber diameter structure as measured in the radial direction.

9. The cylindrical fibrous structure of claim 1 wherein said fibrous mass has a graded fiber diameter structure over substantially its entire structure as measured in the radial direction.

10. The cylindrical fibrous structure of claim 1 wherein said fibrous mass has in a downstream portion thereof a substantially constant voids volume and in an upstream portion thereof the same substantially constant voids volume as in said downstream portion and a graded fiber diameter structure, all as measured in the radial direction.

11. The cylindrical fibrous structure of claim 1 wherein said fibrous structure has a removal rating of from 0.5 to 40 micrometers.

12. A cylindrical fibrous structure comprising a fibrous mass of nonwoven, synthetic, polymeric thermoplastic microfibers having a voids volume in the range of from about 64 to about 93 percent, said microfibers having diameters in the range of from about 1.5 to about 20 micrometers and said microfibers being substantially free of fiber-to-fiber bonding and secured to each other by mechanical entanglement or intertwining, said fibrous mass having a substantially constant voids volume and a graded fiber diameter structure over at least an upstream portion thereof, both as measured in the radial direction to achieve a graded pore size over said portion.

13. The cylindrical fibrous structure of claim 12 wherein said thermoplastic is polypropylene, said voids volume is in the range of from about 75 to about 85 percent, and said microfibers have diameters in the range of from about 1.9 to about 12.6 micrometers.

14. The cylindrical fibrous structure of claim 13 wherein said cylindrical fibrous structure has an efficiency for the removal of Pseudomonas diminuta of at least about 75 percent.

15. The cylindrical fibrous structure of claim 14 wherein said cylindrical fibrous structure has an efficiency for the removal of Pseudomonas diminuta of at least about 90 percent.

16. The cylindrical fibrous structure of claim 15 wherein said cylindrical fibrous structure has an efficiency for the removal of Pseudomonas diminuta of at least about 99.9 percent.

17. The cylindrical fibrous structure of claim 12 wherein said fibrous structure has a removal rating of from 0.5 to 40 micrometers.

18. A cylindrical fibrous structure comprising an open, relatively rigid, central support member and a fibrous mass of nonwoven, synthetic, polymeric microfibers on the exterior of said support, said microfibers substantially free of fiber-to-fiber bonding and secured to each other by mechanical entanglement or intertwining and said fibrous mass having a substantially constant voids volume and varying fiber diameter over at least a substantial portion thereof as measured in the radial direction to achieve a graded pore size over said portion.

19. The cylindrical fibrous structure of claim 18 wherein said fibrous mass has a voids volume in the range of from about 60 to about 95 percent.

20. The cylindrical fibrous structure of claim 19 wherein said fibrous mass has a voids volume in the range of from about 64 to about 93 percent and said microfibers have diameters in the range of from about 1.5 to about 20 micrometers.

21. The cylindrical fibrous structure of claim 20 wherein said fibrous mass has a voids volume in the range of from about 75 to about 85 percent and said microfibers have diameters in the range from about 1.9 to about 12.6 micrometers.

22. The cylindrical fibrous structure of claim 18 wherein said nonwoven, synthetic, polymeric microfibers are comprised of a thermoplastic selected from the class consisting of polyolefins, polyamides and polyesters.

23. The cylindrical fibrous structure of claim 22 wherein said thermoplastic is polypropylene.

24. The cylindrical fibrous structure of claim 18 wherein said fibrous mass has a substantially constant voids volume throughout as measured in the radial direction.

25. The cylindrical fibrous structure of claim 18 wherein said fibrous mass has a continuously graded fiber diameter structure as measured in the radial direction.

26. The cylindrical fibrous structure of claim 18 wherein said fibrous mass has a graded fiber diameter structure over substantially its entire structure as measured in the radial direction.

27. The cylindrical fibrous structure of claim 18 wherein said fibrous mass has in a downstream portion thereof a substantially constant voids volume and in an upstream portion thereof the same substantially constant voids volume as in said downstream portion and a graded fiber diameter structure, all as measured in the radial direction.

28. The cylindrical fibrous structure of claim 18 wherein said central support member comprises a core of self-bonded fibers.

29. The cylindrical fibrous structure of claim 19 wherein said fibrous structure has a removal rating of from 0.5 to 40 micrometers.

30. A cylindrical fibrous structure comprising an open relatively rigid, central support member and a fibrous mass of nonwoven, synthetic, polymeric, thermoplastic microfibers having a voids volume in the range of from about 64 to about 93 percent, said microfibers having diameters in the range of from about 1.5 to about 20 micrometers and said microfibers being substantially free of fiber-to-fiber bonding and secured to each other by mechanical entanglement or intertwining, said fibrous mass having a substantially constant voids volume and a graded fiber diameter structure over at least an upstream portion thereof, both as measured in the radial direction.

31. The cylindrical fibrous structure of claim 30 wherein said thermoplastic is polypropylene, said voids volume is in the range of from about 75 to about 85 percent, and said microfibers have diameters in the range of from about 1.9 to about 12.6 micrometers.

32. The cylindrical fibrous structure of claim 31 wherein said cylindrical fibrous structure has an efficiency for the removal of Pseudomonas diminuta of at least about 75 percent.

33. The cylindrical fibrous structure of claim 32 wherein said cylindrical fibrous structure has an efficiency for the removal of Pseudomonas diminuta of at least about 90 percent.

34. The cylindrical fibrous structure of claim 33 wherein said cylindrical fibrous structure has an efficiency for the removal of Pseudomonas diminuta of at least about 99.9 percent.

35. The cylindrical fibrous structure of claim 30 wherein said fibrous structure has a removal rating of from 0.5 to 40 micrometers.

* * * * *